United States Patent
Van Erp et al.

(10) Patent No.: US 12,063,947 B2
(45) Date of Patent: Aug. 20, 2024

(54) COAGULATION OF THE MARROW IN BONES

(71) Applicant: GEA FOOD SOLUTIONS BAKEL B.V., Bakel (NL)

(72) Inventors: Joost Van Erp, Nuenen (NL); Hendrikus Petrus Gerardus Van Gerwen, Someren (NL)

(73) Assignee: GEA FOOD SOLUTIONS BAKEL B.V., Bakel (NL)

( * ) Notice: Subject to any disclaimer, the term of this patent is extended or adjusted under 35 U.S.C. 154(b) by 489 days.

(21) Appl. No.: 17/057,162

(22) PCT Filed: May 27, 2019

(86) PCT No.: PCT/EP2019/063615
§ 371 (c)(1),
(2) Date: Nov. 20, 2020

(87) PCT Pub. No.: WO2019/224931
PCT Pub. Date: Nov. 28, 2019

(65) Prior Publication Data
US 2021/0251265 A1 Aug. 19, 2021

(30) Foreign Application Priority Data

May 25, 2018 (EP) .................................. 18174306
Sep. 20, 2018 (EP) .................................. 18195724

(51) Int. Cl.
*A23L 13/50* (2016.01)
*A23B 4/01* (2006.01)
(Continued)

(52) U.S. Cl.
CPC ................ *A23L 13/55* (2016.08); *A23B 4/01* (2013.01); *A23B 4/031* (2013.01); *A23B 4/056* (2013.01);
(Continued)

(58) Field of Classification Search
CPC ... A23L 13/55; A23L 5/15; A23L 3/01; A23B 4/056; A23B 7/01; A47J 37/045
See application file for complete search history.

(56) References Cited

U.S. PATENT DOCUMENTS 3,597,228 A 8/1971 Jeppson et al.
4,342,788 A * 8/1982 Clatfelter ................ A23L 13/57
426/243

(Continued)

FOREIGN PATENT DOCUMENTS

| EP | 2546624 A1 * | 1/2013 | ........... G01K 11/006 |
| JP | S63269963 A | 11/1988 | |
| JP | H05308912 A | 11/1993 | |

OTHER PUBLICATIONS

E. 0. ESSARY: "Influence of Microwave Heat on Bone Discoloration", Poultry Science, vol. 38, No. 3, May 1, 1959 (May 1, 1959), pp. 527-529.
(Continued)

*Primary Examiner* — Steven N Leff
(74) *Attorney, Agent, or Firm* — The Dobrusin Law Firm, P.C.

(57) ABSTRACT

A method of treating a meat-substance containing a bone structure. The bone marrow is coagulated with microwaves generated by a solid-state RF energy source. The microwave heating may be carried out prior to a heat treatment of the meat-substance and/or may be carried out after slaughtering and before the fresh slaughtered meat-substance is frozen.

20 Claims, 9 Drawing Sheets

(51) Int. Cl.

|  |  |
|---|---|
| *A23B 4/03* | (2006.01) |
| *A23B 4/056* | (2006.01) |
| *A23B 7/01* | (2006.01) |
| *A23L 3/00* | (2006.01) |
| *A23L 3/01* | (2006.01) |
| *A23L 3/54* | (2006.01) |
| *A23L 5/10* | (2016.01) |
| *A47J 37/04* | (2006.01) |
| *H05B 6/06* | (2006.01) |
| *H05B 6/64* | (2006.01) |
| *H05B 6/68* | (2006.01) |
| *H05B 6/78* | (2006.01) |
| *A22C 17/04* | (2006.01) |
| *A22C 17/08* | (2006.01) |

(52) U.S. Cl.
CPC ............... *A23B 7/01* (2013.01); *A23L 3/001* (2013.01); *A23L 3/003* (2013.01); *A23L 3/01* (2013.01); *A23L 3/54* (2013.01); *A23L 5/11* (2016.08); *A23L 5/15* (2016.08); *A23L 13/57* (2016.08); *A47J 37/045* (2013.01); *H05B 6/06* (2013.01); *H05B 6/6467* (2013.01); *H05B 6/647* (2013.01); *H05B 6/686* (2013.01); *H05B 6/782* (2013.01); *A22C 17/04* (2013.01); *A22C 17/08* (2013.01); *A23V 2002/00* (2013.01); *H05B 2206/045* (2013.01); *H05B 2206/046* (2013.01)

(56) References Cited

U.S. PATENT DOCUMENTS

| 6,132,783 | A | 10/2000 | Rajapakse |
|---|---|---|---|
| 6,246,040 | B1* | 6/2001 | Gunn ..................... H05B 6/48 331/46 |
| 2009/0236335 | A1* | 9/2009 | Ben-Shmuel ...... B65D 81/3453 219/710 |
| 2012/0103975 | A1* | 5/2012 | Okajima ................ H05B 6/705 219/600 |
| 2015/0271877 | A1* | 9/2015 | Johansson ............. H05B 6/686 219/750 |
| 2015/0313273 | A1* | 11/2015 | Stromotich .............. A23B 4/01 34/259 |
| 2016/0331004 | A1* | 11/2016 | Strolenberg ............ A23L 3/365 |

OTHER PUBLICATIONS

International Search Report and Written Opinion, for International Application PCT/EP2019/063615, dated Jul. 22, 2019.
International Preliminary Report on Patentability, for International Application PCT/EP2019/063615, dated Sep. 2, 2020.

\* cited by examiner

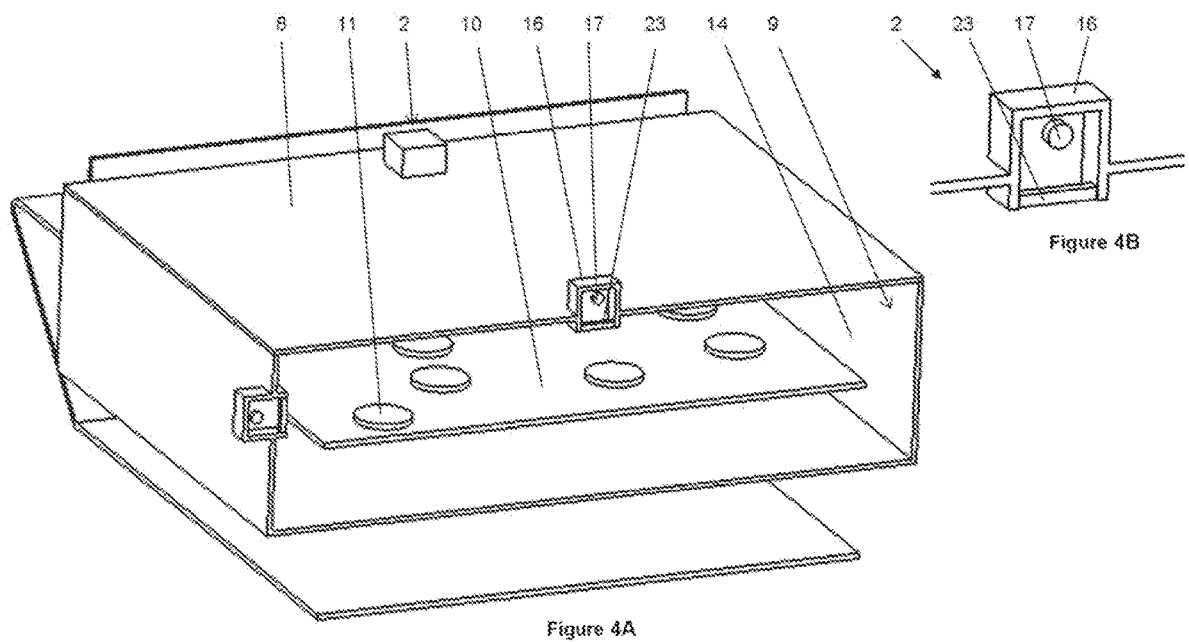

COAGULATION OF THE MARROW IN BONES

CROSS-REFERENCE TO RELATED APPLICATIONS

This application is a National Phase Application of PCT International Application No. PCT/EP2019/063615, International Filing Date, May 27, 2019, claiming priority to EP18174306.3, filed May 25, 2018 and EP18195724.2, International filing Date Sep. 20, 2018, each of which is hereby incorporated by reference in its entirety.

FIELD

The present invention relates to a method of treating a food-substance such as a meat-substance containing a bone structure.

BACKGROUND

The chickens that we eat today are between six and eight weeks old and have under developed more porous bones than older chickens. The bone marrow inside of chicken bones is purplish. In case of heating products such as chicken drumsticks, for instance after coating these products, the purple marrow in the bone leaks through the porous bone and leaks into the meat. The surface of the bones and the adjacent meat become deep red/purple or even black which is visible and unattractive.

SUMMARY

It is therefore the objective of the present invention to provide a method that do not comprise the deficiencies according to the state in the art.

The problem is attained with a method of treating a meat-substance containing a bone structure, wherein the bone marrow is coagulated with microwaves generated by solid-state RF energy source.

The present invention relates to a method of treating a meat substance with a solid-state radio frequency (RF)-transistor(s) in a RF power amplifier. A radio frequency power amplifier is an electronic amplifier, that converts a low power radio frequency signal into a higher power signal. Typically, RF-power amplifiers drive the antenna of a transmitter. The antenna can be coupled to and/or located in a waveguide, wherein the antenna can radiate the microwaves into the waveguide which preferably is designed of reflective material and can guide the microwaves to a desired location, for example into the product chamber wherein the substances to be treated are located. Compared to a magnetron, an advantage of a solid-state RF energy technology is a low voltage drive, semiconductor reliability and lower energy consumption due to the advanced control system. In the present case, the apparatus is used to coagulate used to for example heat, cook, dry disinfect, pasteurize and/or sterilize a substance.

All described embodiments are directed to microwaves generated by solid-state RF energy sources however the described embodiments can also be applied by microwaves generated by a magnetron.

The meat substance can be meat for example from beef, pig, poultry. The meat substance is meat at a bone-structure, wherein the bone structure is at least partially surrounded by the meat. A typical example for a meat substance with a bone structure is a poultry-wing, a poultry-leg, a leg from a pig or a lamb and/or fish. The bones comprise a bone structure and bone marrow, wherein the bone structure surrounds the bone marrow. The meat-substance is preferably a fresh meat substance, i.e. meat immediately or shortly after slaughtering, which is preferably not further processed, except preferably washing and/or disinfection.

Transistor technology generates powerful RF fields. Preferably multiple RF sources will be applied, the sources can be controlled individually and preferably related to each other. For instance, in an application pumping a mass through a tube, gradually heating of the substance can be achieved by controlling the electromagnetic fields by controlling the power level, frequency and phase versus time with such precision that an even energy distribution will be achieved. In general, in case of a change in load in a certain spot of the substance, mass, substance flow or mass flow, the controller can control the specific parameters parameter in that certain spot in order to correct the adverse effects of the load change. For instance, during cooking the load will change constantly, this change in load will be detected via the antenna by measuring the reflected energy. The control system will compare the transmitted energy via the antenna with the reflected energy and will consequently adjust the energy to be transmitted by the antenna. For instance, if no load is present within the product chamber, no energy will be absorbed, the antenna receives the reflected energy and the control unit will stop transmitting new energy to the product chamber. With solid-state RF energy sources, the amplitude, the frequency, the phase versus time and/or the direction, and/or the total radiation energy emitted can be controlled for each and every antenna. Such an advanced energy management system based on a fast response to the heat demand in certain spots of the substance(s) to be heated prevents damaging of internal component and prevents an uncontrolled substance treatment with uneven energy distribution. Due to the efficient use of energy resulting in less energy loss an additional advantage of solid-state RF energy sources is an increase in yield of substances to be treated.

Surprisingly, it has been found, that the leakage of bone marrow can be reduced or preferably stopped by coagulate the marrow within the bones by using microwaves generated by solid-state RF energy sources. Preferably the microwave radiation generated by solid-state RF energy sources is controlled such that the meat that surrounds the bone is heated only to a very small degree. Its temperature preferably rises during treatment of the bone less than 10° C.

Additionally, the meat substance may be treated in a further heat treatment apparatus. In this heat treatment apparatus, the substance is preferably cooked, browned, fried, smoked and/or roasted. The further heat treatment apparatus is, relative to the flow of the substances, downstream from the solid-state radio frequency source(s); i.e. the subjection of the bones with microwaves generated by solid-state RF energy sources takes place prior to further heat treatment steps.

The meat substance is preferably treated in a line which comprises several treatment steps provided in a sequence. The substance is supplied to the line at its begin and is then transported continuously or semi-continuously through the line until the end of the line, where the substance is discharged and/or packaged. The transportation can be done by means of a conveyor, for example a belt, which connects the apparatus. Preferably, the line comprises a common control unit, which controls the individual apparatus as well as the handover of the substances from one apparatus/step to the other.

According to a preferred embodiment of the present invention, the apparatus in which the marrow is treated, may not only comprise one but a multitude of solid-state radio frequency sources. This can be accomplished by using one or more antennas and/or one or more waveguides. Each radio frequency source can be preferably powered individually and each radio frequency source can be preferably controlled, more preferably closed loop controlled, individually. The frequency, the wavelength, the phase versus time, the amplitude, the direction of radiation and/or the overall magnitude of the radiated power can be controlled.

The solid-state radio frequency sources are preferably provided in an array of n columns and m rows, wherein n is an integer>1 and m is an integer≥1. Preferably, the solid-state radio frequencies are arranged equidistantly in one row and/or the columns are also arranged equidistantly. In case a multitude of sources, they can be arranged at random.

Preferably, the solid-state radio frequency sources are provided equidistantly around the circumference of product chamber. In this chamber, the edible substance to be treated will be placed or it will be transported through this product chamber.

According to a preferred embodiment, each apparatus in the line comprises an inlet and an outlet, which are spaced apart from each other. The, preferably edible, substance enters each apparatus through the inlet, passes through the apparatus and then exits the apparatus through the exit which is preferably different from the inlet.

Preferably, each apparatus in the line comprises means to transport the substance past the treatment means of the apparatus, for example the solid-state radio frequency source(s). These means can be a tube and a pump, which pumps the substance through the tube. The tube is in the present case the product chamber. Preferably, the tube is at least partially made from a material, that is at least partially transmittable, preferably transparent for the RF-radiation. The tube can for example be made from a plastic material, preferably from a food grade plastic material. The pump pumps the substance preferably as a continuous or semi-continuous stream past the RF-source(s). The speed at which the substance is pumped is preferably adjustable, so that the residence time in the product chamber can be varied. The means can also be a conveyor, for example a belt, preferably an endless belt or an endless chain, wherein the chain is preferably not made from a metal material. The conveyor is preferably at least partially transmittable for the RF-radiation. This conveyor transports the edible substance, preferably as individual portions, past the solid-state radio frequency source(s). The substances are preferably transported continuously or intermittently by the conveyor. The speed of the conveyor is preferably adjustable, so that the residence time in the product chamber can be varied. Each apparatus of the line may have its own conveyor means, particularly conveyor belt, which transports the substances through the respective apparatus.

At least some of the conveyors, preferably each conveyor, is adapted to the specific requirements in the respective apparatus. The products are preferably handed over from one conveyor to the other. At least one of the conveyors may comprise means to distribute and/or accumulate the products on the respective conveyor and more preferably according to the needs of the specific treatment step.

Preferably, each processing apparatus and/or the line comprises a control system to control the individual apparatus, for example the solid-state radio frequency source(s) and/or the transportation means. The control system preferably comprises one or more sensors, whose signal(s) is used to control the parameters of one or more apparatus in order to achieve desired treatment of the substance. Preferably, each apparatus is controlled individually, but preferably by a common line control system. Preferably one or more sensors are utilized to control one or more solid-state radio frequency source(s), preferably individually and/or related to each other. For instance, in an application pumping a mass through a tube, gradually heating of the mass can be achieved by controlling the electromagnetic fields by controlling the power level, frequency and/or phase versus time with such precision that, for example, an even energy distribution in the product chamber or in the substance will be achieved. The RF-energy load can be adapted to the progress of the treatment process. For instance, during cooking the RF-energy load can change. This change in load can be detected, for example via the antenna by measuring the reflected energy. The control system will compare the transmitted energy via the antenna with the reflected energy and will consequently adjust the energy to be transmitted by the antenna. At each solid-state RF energy sources, the amplitude, the frequency, the wavelength, the phase versus time, and/or direction of radiation can be controlled individually and/or in groups. The antenna may function as a sensor, for example to detect the radiation reflected from the substance to be treated.

The control system preferably controls at least one solid-state radio frequency source such that it specifically heats the meat adhered to the bone structure preferably between 60° ° C. and 100° C. more preferably between 80° ° C. and 90° ° C. and preferably without heating the meat between the bone structure and outer surface of the food product/food substance. This temperature allows a coagulation of the marrow The sensor can sense one or more properties of the substance, for example the energy absorbed by the substance or part of the substance, for example a bone-structure and/or the meat surrounding a bone structure. One sensor can measure what kind of radiation is reflected from the substance, for example the frequency. In case the substance is transported during its treatment, particularly with the RF-radiation, there can be multiple sensors along the transportation path. The local reading of the sensors can be used to control the corresponding local treatment apparatus, for example the solid-state radio frequency source(s) and/or the solid-state radio frequency source(s) upstream and/or downstream from the respective sensor.

A temperature sensor can measure a temperature inside the substance, preferably the core temperature and/or a temperature distribution within the substance and/or the temperature of the bone marrow/bone structure. In case the substance is transported during its treatment, particularly with the RF-radiation, there can be multiple sensors along the transportation path. The local reading of the sensors can be used to control the corresponding local treatment apparatus, for example the solid-state radio frequency source(s) and/or the solid-state radio frequency source(s) upstream and/or downstream from the respective sensor.

The method, preferably also comprises one or more treatment steps upstream and/or downstream from the marrow coagulation step with the solid-state radio frequency source(s), which change the consistency, the shape and/or the surface of the meat substance, for example a freezing-, cutting-, grinding, injection-, marinating-station, a forming station, a batter-station and/or a marination-station. The stations can be combined with conveyors.

According to the invention, the meat substance comprises a bone-structure, wherein at least one solid-state radio frequency source is controlled to specifically heat the bone-structure. This can be for example carried out by controlling the frequency, the wavelength, the phase versus time, the amplitude, the direction of radiation and/or the overall magnitude of the radiated power of at least one RF energy source such that specifically the bone structure is heated, so that its temperature is increased fast, while preferably the other meat of the substance is heated less or preferably not heated.

The meat substance can be transported continuously and/or intermittently. They can be transported as a string as an array or as individual portions.

At least one parameter of the meat substance to be treated can be inputted into a control system and that a control unit sets the parameters at least for the solid-state RF energy source microwave heating step accordingly. One example of a parameter is for example the size of the bone structure, preferably the average size of the bone-structure, or the volume of the bone structure, preferably versus the volume of the surrounding meat and/or the temperature of the bone structure, specifically the marrow that has to be reached.

The microwave heating to achieve coagulation is preferably carried out prior to a heat treatment of the substance, preferably in an oven or a fryer, or prior to freezing of the substance.

According to a preferred embodiment, the microwave heating, that leads to an at least partial coagulation of the marrow is carried out after slaughtering and preferably before the fresh slaughtered meat-substance is frozen. I.e. the slaughtered meat substance is treated with microwaves generated by solid-state RF energy source until the marrow is at least partially, preferably entirely coagulated. Only after this treatment step has taken place, the product is frozen and later on, for example after several days or weeks subjected to a further heat treatment step.

According to a preferred embodiment of the present invention, the meat-substance is thawed and then subjected to a heat treatment. Preferably, the bone marrow is heated during thawing, more preferably until at least partial, preferably entire coagulation of the marrow.

Preferably, the power level, frequency, wavelength, phase versus time, amplitude, magnitude of radiated power and/or direction of the RF-energy source is set such that the radiation penetrates the meat and the bone structure. More preferably, the microwave radiation is not absorbed by the bone structure and/or the meat that surrounds the bone.

Preferably, the temperature of the bone structure and/or the bone marrow is measured during the microwave heating to coagulate the marrow.

According to a preferred embodiment of the present invention, the meat of the meat-substance is at least partially, preferably entirely, frozen without freezing the bone and simultaneously and/or afterwards the bone marrow is coagulated with microwaves generated by solid-state RF energy source.

The freezing of the meat below 0° C., without freezing the bone, does not make the bone porous and the marrow does not expand. Additionally, the frozen meat is more transparent to microwave radiation. The treatment of the bone marrow can take place, while the meat of the meat-substance is frozen or afterwards. The meat of the meat-substance does not need to be entirely frozen.

Preferably, in a subsequent step the meat of the meat-substance is heated, preferably to 60-100° C. more preferably 80-90° C.

Method according to claim 10 or 11, wherein the substance is frozen, preferably to −10° C. or less.

The invention is now explained according to the Figures. The explanations apply for all embodiments of the present invention likewise.

BRIEF DESCRIPTION OF THE FIGURES

FIGS. 1a-1c, 2a-2c, 3a-3c, 4 and 5 each depict a heat treatment line 1 comprising conveyor means.

DETAILED DESCRIPTION

Figure 1A:
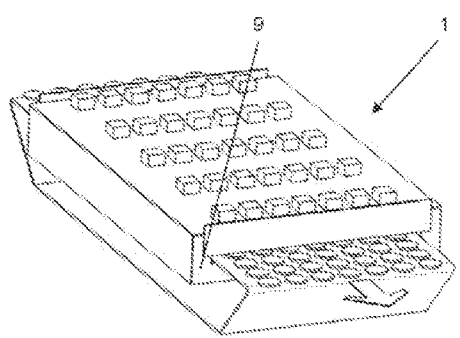
Figure 1B:
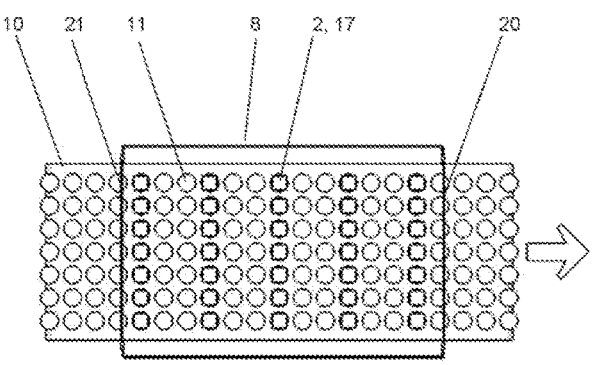
Figure 1C:
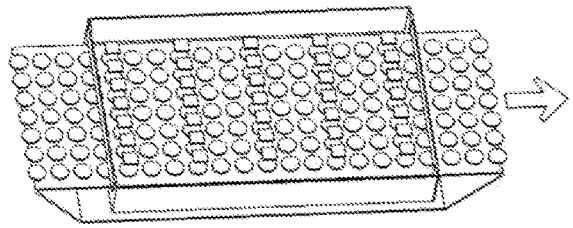

FIGS. 1a-1c depict a heat treatment apparatus 1 comprising conveyor means 10, here an endless belt, running through a housing 8, here a tunnel shaped housing, provided with an inlet 21 and an outlet 20, which are separated from each other. The substances 11 is transported past at least one, preferably a multiple, of solid-state RF energy sources 2. The housing 8 can extend in the transport direction around the substances 11 to be heat treated and/or around the conveyor means 10. The housing preferably comprises a slot at the inlet and at the outlet for the conveyor means 10. The housing 8 can be similar to a Faraday cage preventing electromagnetic waves coming out of the housing. At least the inner wall 9, but preferably the entire housing 8, can be made of metal, preferably steel, for instance stainless steel to shield the electromagnetic radiation. In a preferred embodiment, the housing 8 comprises reflection- and/or absorption means at its inner surface to at least partially eliminate radiation from external sources that enters the housing through the inlet and/or the outlet. The reflection- and/or absorption means avoids that this electromagnetic radiation reaches the antenna 17. The radiation from the multiple antennas preferably need not have to be shielded from each other.

The number of solid-state elements 2/antennas 17 preferably depends on, for instance, the required heating power, the width of the belt, the length of the housing, the number and/or size and/or consistency of substances 11, the position of the substances on the belt, the speed of the belt and/or the desired accuracy and/or speed of the heat treatment process, particularly the uniformity of the heating process. FIGS. 1a-1c show an embodiment with multiple solid-state elements 2/antennas 17 positioned in each and every line of food substances. The substances 11, here provided in arrays, are transported continuously or intermittently from the inlet 21 to the outlet 20 and past the solid-state RF energy sources 2, which emit microwaves, which heat the substances 11. Preferably, a multitude of rows, here five, of elements 2/antennas 17 are provided along the path of the substances 11. The rows of solid-state elements 2/antennas 17 are provided preferably equidistantly and/or each line comprises a multitude of solid-state elements 2/antennas 17, which are preferably arranged perpendicular to line of transportation of the substances 11. In each row, the solid-state elements 2 are preferably arranged equidistantly. Each solid-state element 2 is preferably controlled individually and/or each solid-state element 2 or a group of solid-state elements 2/antennas 17 in one line are controlled individually.

Figure 2A:
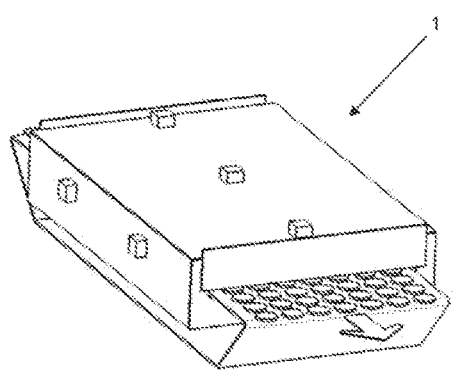
Figure 2B:
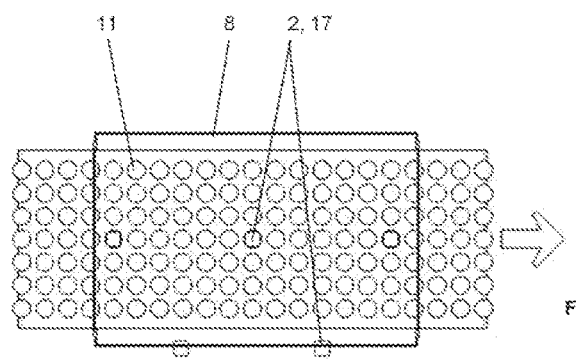
Figure 2C:
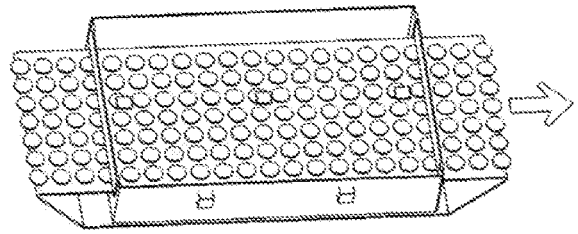

Regarding the embodiment of FIGS. 2a-2c, reference can be made to the disclosure regarding FIGS. 1a-1c. FIGS. 2a-2c show an embodiment wherein the heat treatment apparatus 1 is provided with multiple, here three solid-state elements 2/antennas 17, here above the substances and two in one of the two sidewalls of housing 8. In this example, the substances are arranged in an array and transported as an array past the solid-state elements 2/antennas 17.

Figure 3A:
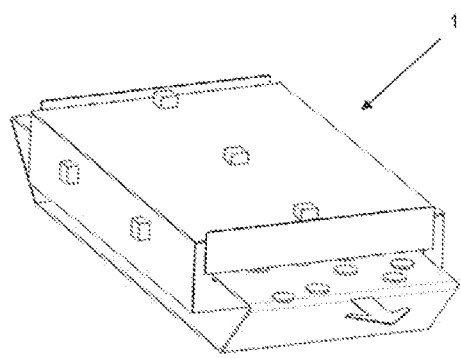
Figure 3B:
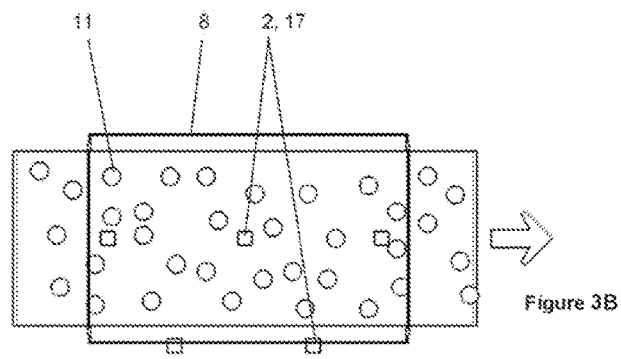
Figure 3C:
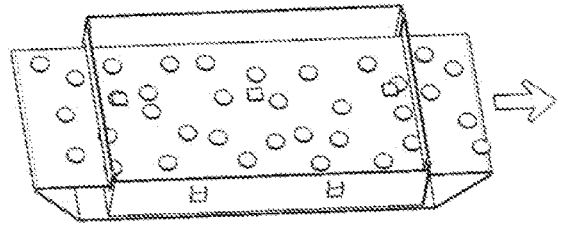

FIGS. 3a-3c depict an embodiment with randomly oriented meat substances on the conveyor means 10. Otherwise, reference is made to disclosure regarding FIGS. 1a-1c and FIGS. 2a-2c.

Regarding the embodiment according to FIGS. 4a-4c reference is made to the disclosure according to the previous Figures. FIGS. 4a-4c depict a cross view and a detail of an embodiment of a solid-state RF energized microwave apparatus. The solid-state energy sources 2 comprise a waveguide 16 and/or an antenna 17. The energy sources are preferably in direct contact with chamber 14 wherein the substances can be (pre)heated and/or (pre)cooked. Preferably microwave transparent shielding means 23 are provided to prevent pollution of the waveguide and antenna for example with the food substance.

Figure 5:
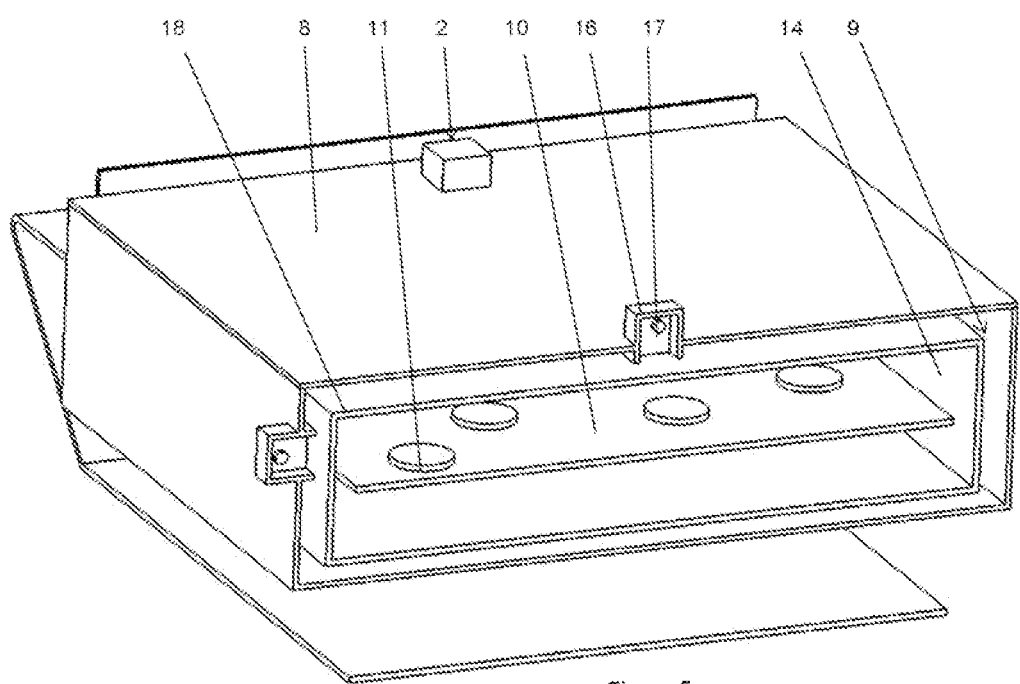

Regarding the embodiment according to FIG. 5 reference is made to the disclosure according to the previous Figures. FIG. 5 depicts a cross view of an embodiment of a solid-state RF energized microwave apparatus wherein a cooling chamber 18 is provided which is connected to a cooling circuit for instance a water cooling- and/or a gas-, preferably air-, cooling circuit. Shielding means 23 as depicted in FIGS. 4a-4c are preferably provided to protect the solid-state element 2/antenna 17 against the cooling medium. Despite this efficient energy management additional cooling of the waveguides and connected antennas may be desirable in case of high energy output, for example during a long period of operation time. In another not depicted embodiment the solid-state RF energy source can be cooled and/or its power supply. This can be done per RF energy source 2 if needed. The cooling of the solid-state RF energy source(s) is preferably controlled by a temperature measurement, which measures the temperature of one or more of the RF energy source 2 and based on this reading controls a fluid flow of the cooling agent and/or its temperature.

Figure 6:
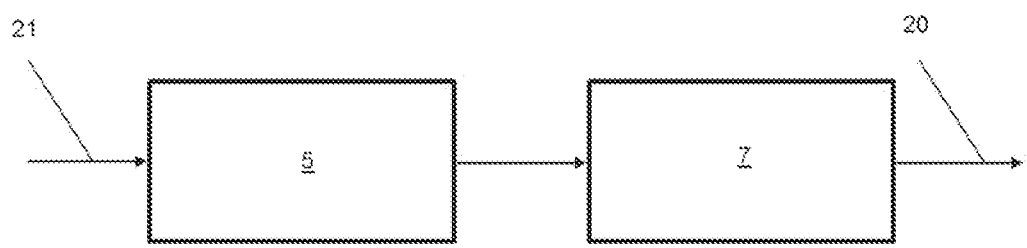
FIGS. 6, 7, 8, 9, 10, 11, and 12 each depict an embodiment of the inventive method

FIG. 6 depicts a first embodiment of the inventive method. The meat substance is provided through an inlet 21 into an apparatus 5 in which the marrow of the bone of the meat structure is at least partially, preferably entirely coagulated by microwaves generated by solid-state RF energy source. Due to this coagulation, the coloring of the meat due to marrow migration through the bone into the meat in the subsequent heat treatment step 7 is minimized. The heat treatment step can for example be frying, browning, smoking, cooking and/or heat treatment by subjecting the food substance to impingement with hot air and/or super-heated steam. Subsequently, the meat product exits the line, as symbolized by arrow 20 and is for example frozen and/or packaged. The skilled person understands that the heat treatment is optional.

Figure 7:
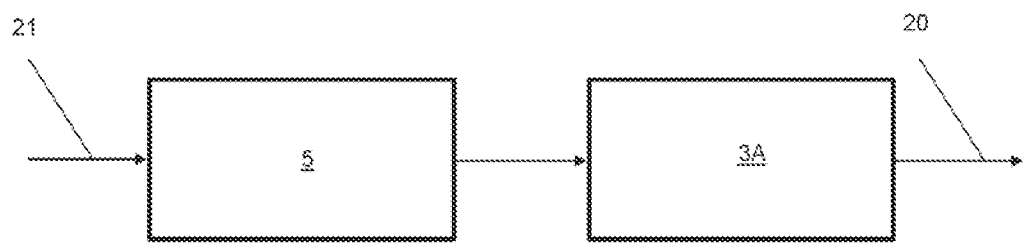

FIG. 7 depicts a second embodiment of the inventive method. In the present example, preferably freshly slaughtered meat substance, which was not yet been frozen is provided through an inlet 21 into an apparatus 5 in which the marrow of the bone of the meat structure is at least partially, preferably entirely coagulated by microwaves generated by solid-state RF energy source. Subsequently, the meat substance including bone marrow/bone structure will be frozen 3A in a freezer, before it is for example packaged.

Figure 8:
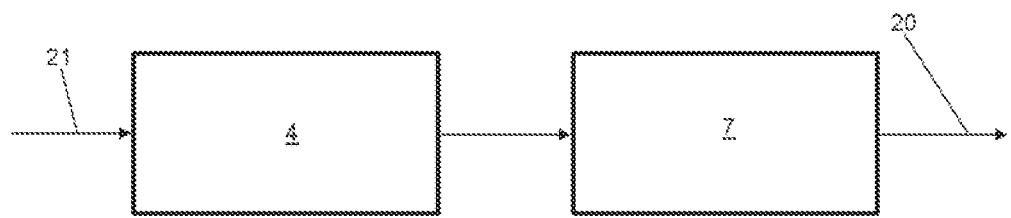

FIG. 8 depicts a third embodiment of the inventive method. The meat substance is provided through an inlet 21 into a thawer 4 in the meat substance is thawed. In the same apparatus 5 before, during and/or after, but preferably during, the thawing, the marrow of the bone of the meat structure is at least partially, preferably entirely coagulated by microwaves generated by solid-state RF energy source. Due to this coagulation, the coloring of the meat due to marrow migration through the bone into the meat in the subsequent heat treatment step 7 is minimized. The heat treatment step can for example be frying, browning, smoking, cooking and/or heat treatment by subjecting the food substance to impingement with hot air and/or super-heated steam. Subsequently, the meat product exits the line, as symbolized by arrow 20 and is for example frozen and/or packaged. The skilled person understands that the heat treatment is optional.

Figure 9:
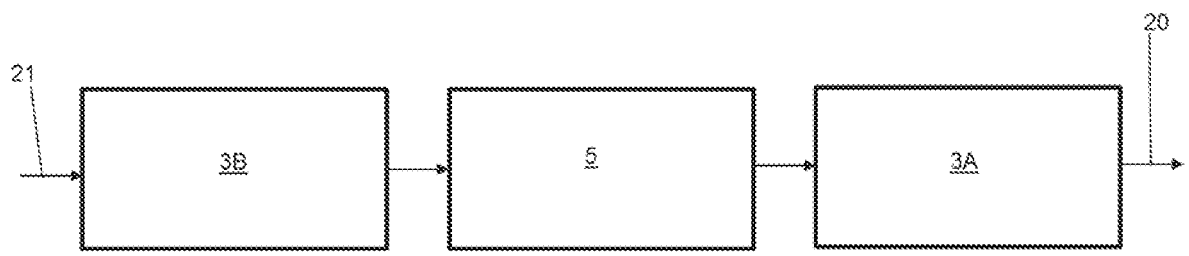

FIG. 9 depicts a fourth embodiment of the inventive method. The meat substance will first be frozen 3B preferably without freezing the bone structure and bone marrow. By freezing the meat substance, preferably in a range between 0 and −20° C., it will be highly transparent to microwaves. In a next step 5 microwave energy generated with solid-state RF energy sources will be applied in order to coagulate the bone marrow. The temperature of the meat around the bone structure should be increased up to the desired temperature, preferably between 60° C. and 100° C. (reduction of bacteria to a safe level). Due to the frozen meat substance the meat will accumulate less microwave energy. In a next step the food product will be finally frozen 3A.

This process is advantageous for further processing of the product, because the meat substance needs later only to be heated until a temperature of for instance 72° ° C. while the bone marrow/structure is already cooked until the desired temperature, i.e the bone does not need to be heated. This will reduce the residence time (shorter process time) within the oven resulting in less evaporation of food substance moisture and less energy consumption.

Figure 10:
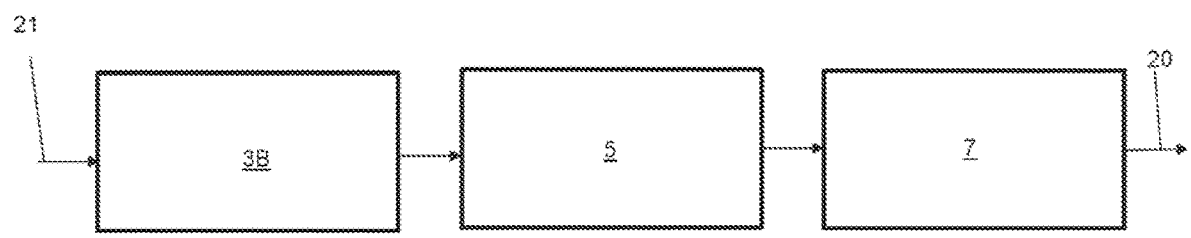

FIG. 10 depicts a fifth embodiment of the inventive method similar to FIG. 9 except after coagulation 5 the substance will in this embodiment be subjected to heat treatment step 7.

Figure 11:
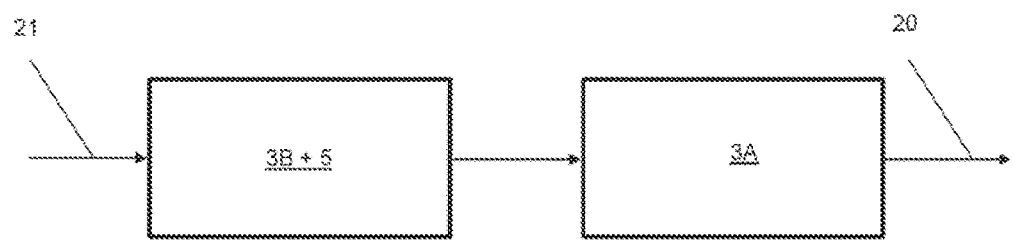

FIG. 11 depicts a sixth embodiment of the inventive method. The meat substance and preferably not the bone marrow/bone structure will simultaneously be frozen 3B and subjected to a heat treatment with solid-state RF energy sources in order to coagulate 5 the bone marrow. This method results in relatively small ice crystals preventing ice crystals from breaking down the bone structure. Freezing will take place from the outside to the inside and coagulation of the bone marrow will take place at the inside. After this combined step 3B/5 and/or after coagulation 5 of the bone marrow has finished freezing will be continued till the entire food substance including bone marrow is frozen 3A to the right temperature.

Figure 12:
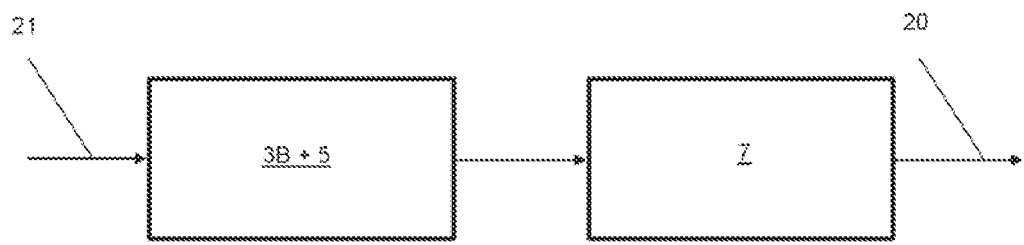

FIG. 12 depicts a seventh embodiment of the inventive method similar to FIG. 11 except after freezing 3B/coagulation 5 the substance will in this embodiment be subjected to heat treatment step 7.

All described embodiments are directed to microwaves generated by solid-state RF energy sources however the described embodiments can also be applied by microwaves generated by a magnetron.

LIST OF REFERENCE SIGNS 1 processing apparatus, microwave apparatus, heat treatment apparatus
2 solid-state RF energy source
3A freezing meat substance including bone marrow/bone structure
3B freezing meat substance and preferably not freezing bone marrow/bone structure
4 Thawing 5 solid-state RF energy source microwave marrow coagulation
7 further heat treatment
8 housing
9 inner wall housing 8
10 conveyor means
11 product, food product, substance
13 solid-state RF energy source microwave drying
14 product chamber, cooking chamber
16 waveguide
17 antenna
18 cooling chamber
20 outlet, exit
21 inlet
23 microwave transparent shielding means

The invention claimed is:

1. A method of treating a meat-substance containing a bone structure comprising bone marrow in an apparatus, the method comprising: coagulating the bone marrow with microwaves generated by a plurality of solid-state RF energy sources, wherein the apparatus comprises a housing, a conveyor for conveying the meat-substance through the housing, the meat-substance is configured to be arranged on the conveyor in rows, the plurality of solid-state RF energy sources are arranged in rows on the apparatus, the rows of the plurality of solid-state RF sources are configured to be aligned with the rows of the meat-substance on the conveyor such that one or more of the rows of the meat-substance arranged on the conveyor pass under a respective one of the rows of the plurality of solid-state RF sources, wherein the apparatus comprises a cooling chamber comprising a cooling agent, the cooling chamber is located in between the housing and the conveyor, the cooling chamber surrounds the conveyor, wherein the method comprises measuring a temperature of one of more of the plurality of solid-state RF energy sources, and then based on the measuring step, the method comprises controlling a fluid flow of the cooling agent and/or a temperature of the cooling agent to cool the plurality of solid-state RF energy sources.

2. The method according to claim 1, wherein the coagulating is carried out prior to a subsequent heat treatment of the meat-substance.

3. The method according to claim 2, wherein the coagulating is carried out after slaughtering and before a step of freezing the meat-substance.

4. The method according to claim 1, wherein the meat-substance is thawed and then subjected to a subsequent heat treatment.

5. The method according to claim 4, wherein the bone marrow is heated during a thawing step.

6. The method according to claim 4, wherein the subsequent heat treatment step is carried out in an oven or a fryer or prior to a step of freezing the meat-substance.

7. The method according to claim 1, wherein a power level, frequency, wavelength, phase versus time, amplitude, magnitude of radiated power and/or direction of the plurality of solid-state RF-energy sources is set such that radiation penetrates the meat-substance and the bone structure.

8. The method according to claim 1, wherein a temperature of the bone structure and/or the bone marrow is measured during the coagulating step.

9. The method according to claim 8, wherein a signal of a temperature measurement is utilized to control the plurality of solid-state RF-energy sources.

10. The method according to claim 1, wherein the meat of meat-substance is at least partially frozen without freezing the bone structure and simultaneously and/or afterwards the bone marrow is coagulated with the microwaves generated by the plurality of solid-state RF energy sources.

11. The method according to claim 10, wherein, the meat of the meat-substance is heated to 60° C.-100° C.

12. The method according to claim 10, wherein the meat-substance is frozen to −10° C. or less.

13. The method according to claim 1, wherein the method comprises controlling the plurality of solid-state RF energy sources with a control system by comparing transmitted energy with reflected energy and then based on the comparing step, the method comprises a step of adjusting new energy transmitted by the plurality of solid-state RF energy sources.

14. The method according to claim 1, wherein the method comprises measuring a temperature of the bone marrow with a temperature sensor.

15. The method according to claim 1, wherein before the coagulating step, the method comprises freezing the meat-substance without freezing the bone structure and the bone marrow.

16. The method according to claim 15, wherein the method comprises a step of measuring a temperature of the bone marrow with a temperature sensor.

17. The method according to claim 16, wherein the meat of meat-substance is at least partially frozen without freezing the bone structure and simultaneously the bone marrow is coagulated with the microwaves generated by the plurality of solid-state RF energy sources.

18. The method according to claim 16, wherein the meat-substance is treated with the microwaves generated by the plurality of solid-state RF energy sources until the bone marrow is entirely coagulated and after the bone marrow is entirely coagulated, the method comprises freezing the meat-structure.

19. The method according to claim 1, wherein the cooling agent is water.

20. The method according to claim 1, wherein the cooling agent is gas or air.

* * * * *